(12) United States Patent
Shrestha et al.

(10) Patent No.: US 11,677,631 B2
(45) Date of Patent: Jun. 13, 2023

(54) SYSTEM FOR PERFORMING A DATA CENTER ASSET BRIDGING OPERATION

(71) Applicant: Dell Products L.P., Round Rock, TX (US)

(72) Inventors: Saurav Shrestha, Round Rock, TX (US); Jeffrey M. Lairsey, Round Rock, TX (US); Carlin Mendonca, Austin, TX (US); Margaret Patton, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/371,687

(22) Filed: Jul. 9, 2021

(65) Prior Publication Data

US 2023/0009170 A1  Jan. 12, 2023

(51) Int. Cl.
*G06F 15/16* (2006.01)
*H04L 41/12* (2022.01)
*H04L 67/10* (2022.01)
*H04L 41/22* (2022.01)

(52) U.S. Cl.
CPC ............ *H04L 41/12* (2013.01); *H04L 41/22* (2013.01); *H04L 67/10* (2013.01)

(58) Field of Classification Search
CPC .......... H04L 41/12; H04L 41/22; H04L 67/10
See application file for complete search history.

(56) References Cited

U.S. PATENT DOCUMENTS

| | | | |
|---|---|---|---|
| 2010/0235903 A1* | 9/2010 | Carter | H04L 67/10 718/1 |
| 2011/0022812 A1* | 1/2011 | van der Linden | H04L 69/08 711/E12.001 |
| 2012/0281706 A1* | 11/2012 | Agarwal | H04L 12/4633 370/395.53 |

OTHER PUBLICATIONS

Microsoft, Azure Hybrid Cloud, Modernize your on-premises infrastructure with public and private cloud capabilities, downloaded from the internet Jun. 28, 2021.

* cited by examiner

*Primary Examiner* — Padma Mundur
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: providing a data center asset with a data center asset bridging module, the data center asset comprising a data center asset user interface; establishing access to the data center asset; when access to the data center is established, enabling a connection between a cloud-based data center monitoring and management console and the data center asset via the data center asset bridging module; and, exchanging information between the data center asset and the cloud-based data center monitoring and management console via the bridging module.

9 Claims, 6 Drawing Sheets

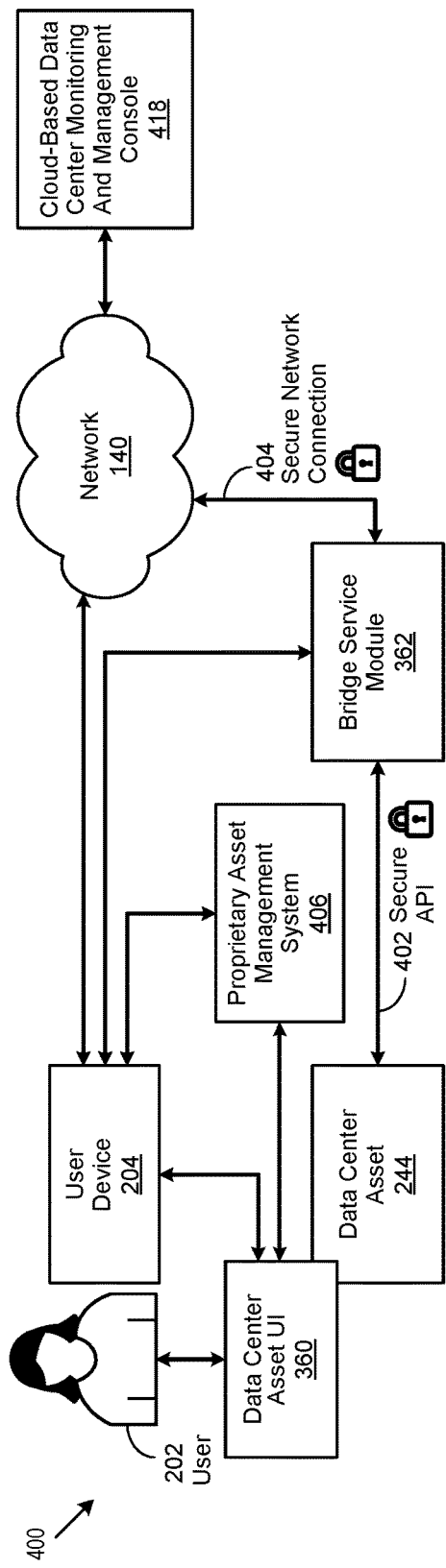
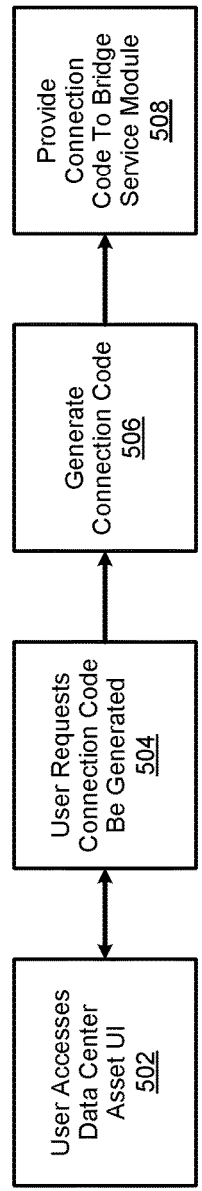
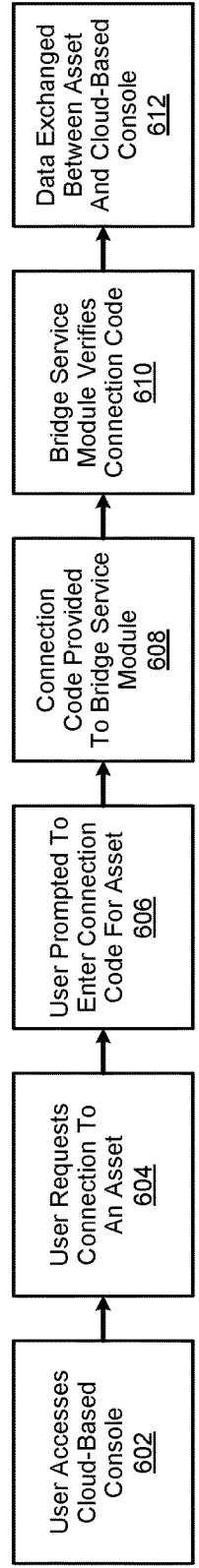

Generate Connection Code — 714

ASSET INFORMATION — 716
- Asset Name: Asset Name and ID
- IP Address: xxx.xxx.xxx.xxx
- Service Tag: Service Tag Number

ACCESS DETAILS — 718
- ● Always Allow
- ○ Next [2 ▽] Hours
- ○ One Time / Single Session Access
- ○ Date Range [   ] To [   ]

PERMISSIONS — 720
- [X] Monitoring
- [X] Management
- [X] Reboot

CONNECTION CODE — 722
Enter Unique Asset Code: — 726
[Generate]
□□□□□□ — 724

[Cancel] [Apply] — 730

702

User Interface

*Figure 7*

SYSTEM FOR PERFORMING A DATA CENTER ASSET BRIDGING OPERATION

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: providing a data center asset with a data center asset bridging module, the data center asset comprising a data center asset user interface; establishing access to the data center asset; when access to the data center is established, enabling a connection between a cloud-based data center monitoring and management console and the data center asset via the data center asset bridging module; and, exchanging information between the data center asset and the cloud-based data center monitoring and management console via the bridging module.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing a data center asset with a data center asset bridging module, the data center asset comprising a data center asset user interface; establishing access to the data center asset; when access to the data center is established, enabling a connection between a cloud-based data center monitoring and management console and the data center asset via the data center asset bridging module; and, exchanging information between the data center asset and the cloud-based data center monitoring and management console via the bridging module.

In another embodiment the invention relates to a computer-readable storage medium embodying computer program code, the computer program code comprising computer executable instructions configured for: providing a data center asset with a data center asset bridging module, the data center asset comprising a data center asset user interface; establishing access to the data center asset; when access to the data center is established, enabling a connection between a cloud-based data center monitoring and management console and the data center asset via the data center asset bridging module; and, exchanging information between the data center asset and the cloud-based data center monitoring and management console via the bridging module.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a functional block diagram of a bridge service module implemented to perform a data center asset bridging operation;

FIG. 5 is a simplified process flow diagram showing the performance of data center asset bridging operations to generate a connection code corresponding to an associated data center asset;

FIG. 6 is a simplified process flow diagram showing the performance of data center asset bridging operations to use a connection code to connect to an associated data center asset;

FIG. 7 shows an example screen presentation of a data center asset user interface (UI) implemented to generate a data center asset connection code.

DETAILED DESCRIPTION

Figure 1:
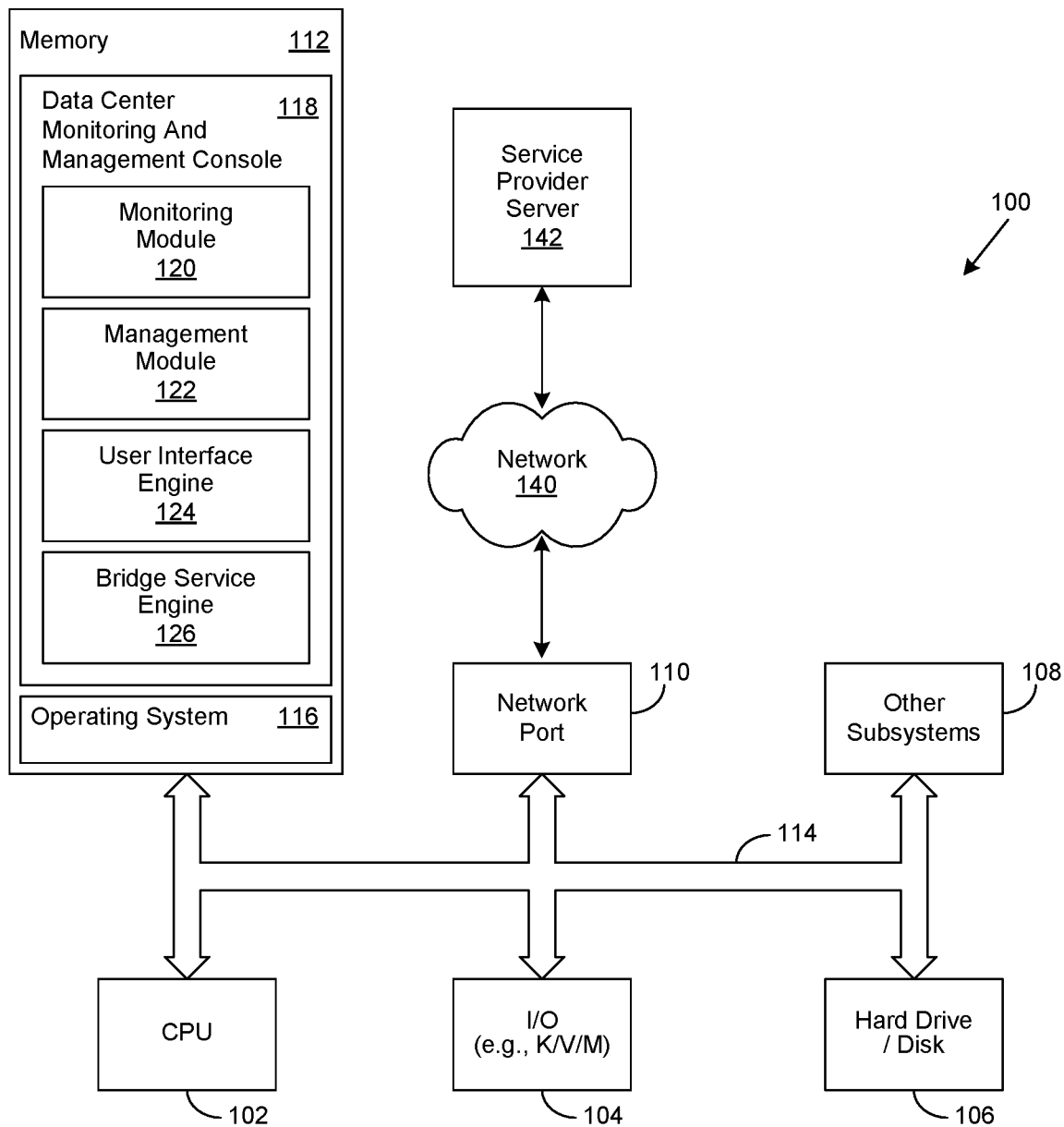
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Certain aspects of the invention likewise reflect an appreciation that a wide variety of cloud computing services are now available from many different cloud providers. Likewise, certain aspects of the invention reflect an appreciation that such cloud services have become integral to many organization's computing infrastructure overall strategy and day-to-day operations. Furthermore, certain aspects of the invention reflect an appreciation that the operational visibility of on-premises data center assets from a cloud-based datacenter management console can often provide a broader, more holistic view of their computing infrastructure.

However, setting up connections between on-premises devices and a cloud-based data center management console is often challenging. Current approaches to establishing such connectivity typically involves an on-premises data center management console aggregating and sending data about the devices managed by the on-premises console to the cloud-based data center management console. Moreover, on-premises computing infrastructure information is typically secured, adding an additional layer of complexity. Accordingly, certain aspects of the invention reflect an appreciation that this intermediary step creates a time-consuming and cumbersome barrier to getting on-premises device information to a cloud-based console.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, a user interface engine 124, and a bridge service engine 126, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
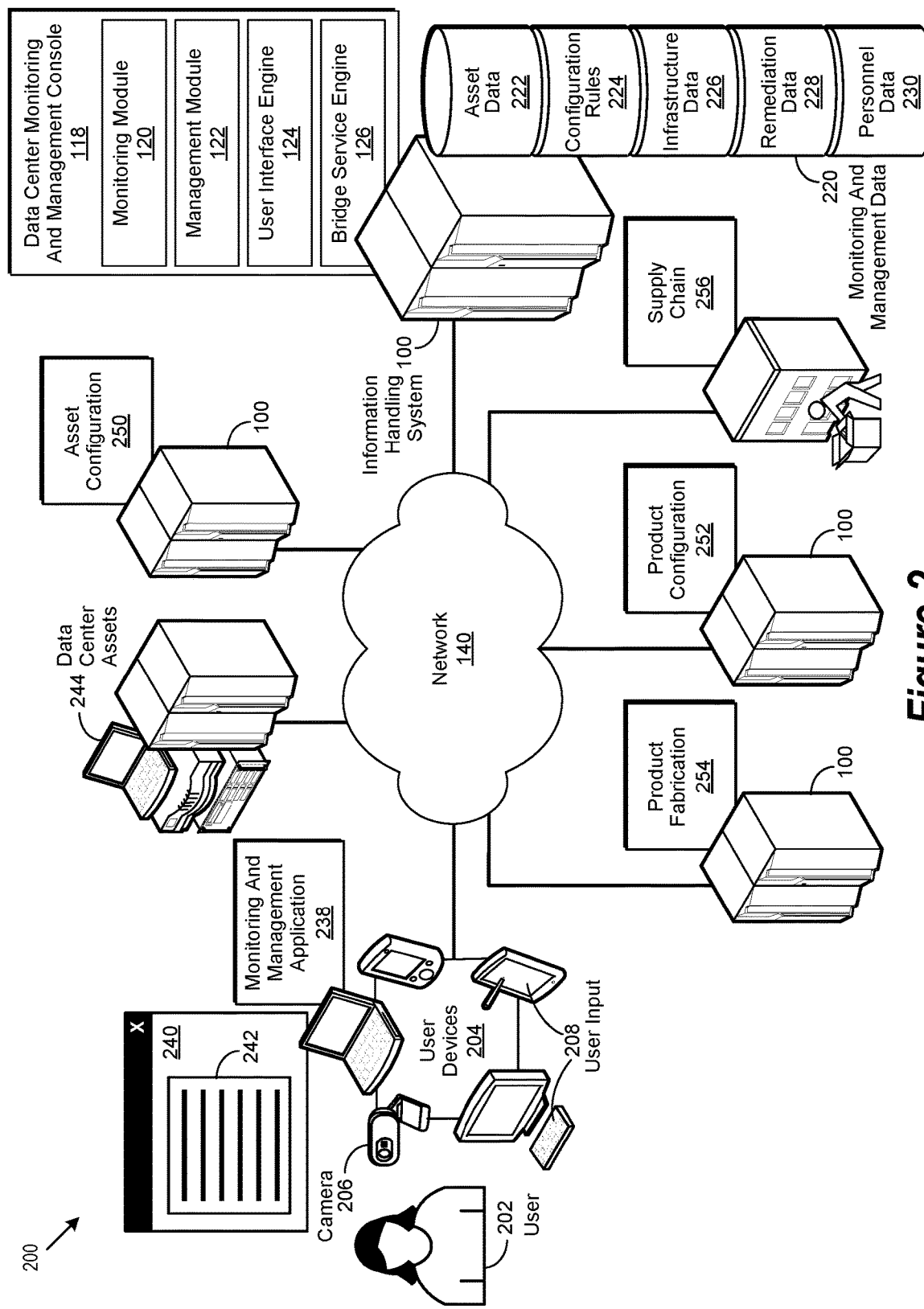
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, a user interface (UI) engine 124, and a bridge service engine 126, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244. In various embodiments, the bridge service engine 126 may be implemented to perform a data center asset bridging operation, individually or in combination with the data center monitoring and management console 118, as described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 222 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
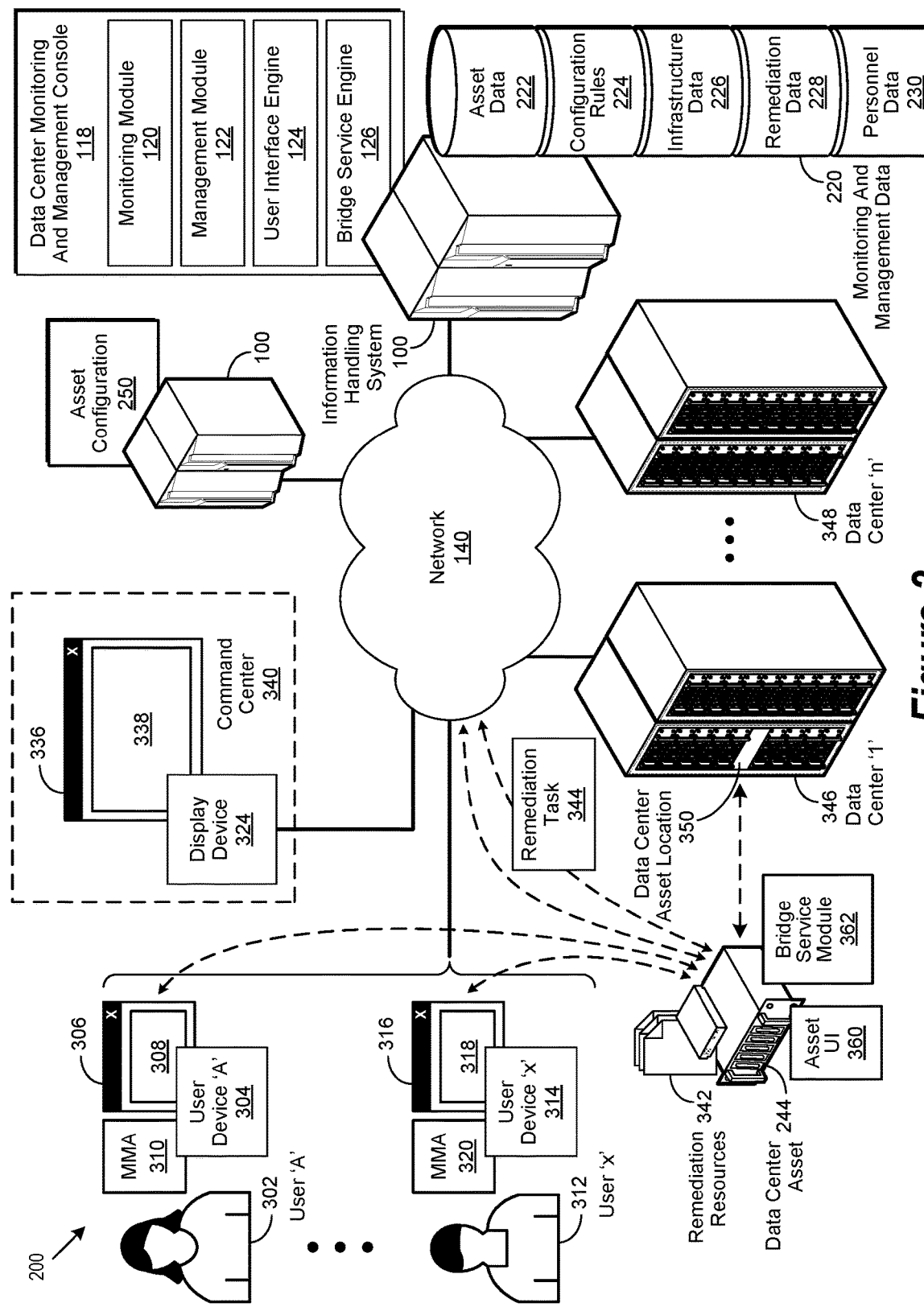
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, a user interface (UI) engine 124, and a bridge service engine 126, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 340, familiar to those of skill in the art, such as a command center 340 typically found in a data center or a network operations center (NOC). In various embodiments, one or more of the users 'A' 302 through 'x' 312 may be located within the command center 340. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 340 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

FIG. 4 shows a functional block diagram of a bridge service module implemented in accordance with an embodiment of the invention to perform a data center asset bridging operation. As used herein, a data center asset bridging operation broadly refers to any task, function, procedure, or process performed, directly or indirectly, within a cloud computing environment 400 to establish a network 140 connection between a data center asset 244 and a cloud-based data center monitoring and management console 418. A cloud computing environment 400, as likewise used herein, broadly refers to a data center monitoring and management environment, described in greater detail herein, whose associated data center assets are implemented to provide cloud computing services, familiar to skilled practitioners of the art, on-demand, over a connection to a network 140. As likewise used herein, a cloud-based data center monitoring and management console 418 broadly refers to a data center monitoring and management console, described in greater detail herein, whose associated functionality and capabilities can be provided in a cloud computing environment 400 as a service. In certain embodiments, the cloud computing environment may be implemented as a proprietary cloud computing environment 400, a third party cloud computing environment 400, or a hybrid cloud computing environment 400.

In certain embodiments, a data center asset 244 may be implemented with a bridge service module 362. In various embodiments, a secure application program interface (API) 402, familiar to those of skill in the art, may be used to implement the data center asset 244 with the bridge service module 362. In various embodiments, the secure API 402 may be implemented to be adapted to securely provide certain parameters associated with a particular data center asset 244 to the bridge service module 362. In certain embodiments, the secure API 402 may be implemented to securely provide the bridge service module 362 certain information associated with a data center asset 244, such as its identifier (ID), name, location, and health, or even complete device details necessary for configuration and other tasks.

In certain embodiments, the secure API 402 may be implemented to securely provide different levels of information associated with a particular data center asset 244 to the bridge service module 362 based upon a particular task or operation, such as a data center asset bridging operation. In certain embodiments, the secure API 402 may be implemented to securely provide an associated data center asset's 244 connection code, described in greater detail herein, to the bridge service module 362 during the performance of a data center asset bridging operation. In these embodiments, the method by which the secure API 402 is selected, or implemented, or managed, or a combination thereof, is a matter of design choice.

In various embodiments, the bridge service module 362, or the cloud-based data center monitoring and management console 418, individually or in combination, may be implemented to perform a data center asset bridging operation. In certain of these embodiments, the data center asset bridging operation may be performed to exchange certain data center asset monitoring and management information between a particular data center asset 244 and the cloud-based data center monitoring and management console 418. In certain embodiments, the data center asset monitoring and management information that is exchanged may be used by the cloud-based data center monitoring and management console 418 to perform one or more data center asset monitoring and management operations, as described in greater detail herein. In certain embodiments, the data center asset bridging operation may be performed in a proprietary cloud computing environment 400, a third party cloud computing environment 400, or a hybrid cloud computing environment 400.

In various embodiments, the cloud-based data center monitoring and management console 418, the data center asset 244, and the bridge service module 362 may be implemented in a proprietary cloud computing environment 400. As used herein, a proprietary cloud computing environment 400 broadly refers to a cloud computing environment 400 whose associated data center assets are physically located, operated, and managed, or a combination thereof, on the premises of the user 202 of the cloud computing services it may provide. As an example, an organization may have five separate data center locations, each of which includes a data center monitoring and management environment. In this example, the five data center monitoring and management environments may be interconnected by a wide area network (WAN), such as the Internet, to operate as a single, proprietary cloud computing environment 400. To continue the example, the cloud-based data center monitoring and management console 418 may be physically located in only one location, but be implemented as a cloud computing service to perform data center asset monitoring and management operations for data center assets located at all five data center locations.

In various embodiments, the cloud-based data center monitoring and management console 418, the data center asset 244, and the bridge service module 362 may be implemented in a third party cloud computing environment 400. As used herein, a third party cloud computing environment 400 broadly refers to a cloud computing environment 400 whose associated data center assets are physically located on the premises of a third party provider of cloud computing services and operated or managed, or both, on behalf of a user 202 of the cloud computing services it may provide. As an example, a third party provider of cloud services may have four separate data center locations, each of which includes a data center monitoring and management environment. In this example, the four data centers have an installed base of servers that were sourced from three different manufacturers, each of which has a proprietary server management system. To continue the example, the four data center monitoring and management environments may be interconnected by a WAN, such as the Internet, to operate as a single, third party cloud computing environment 400.

To further continue the example, the third party provider of cloud services may want to have a single, unified data center asset management system to monitor and manage all of their data center assets, including their installed base of servers. To continue the example yet further, the cloud-based data center monitoring and management console 418 may be physically located in only one location, but be implemented as a cloud computing service to perform data center asset monitoring and management operations for data center assets located at all four data center locations. Accordingly, the third party provider of cloud services can achieve their objective of a single, unified data center asset management system to monitor and manage all of their data center assets, regardless of where they may be located.

In various embodiments, the cloud-based data center monitoring and management console 418, the data center asset 244, and the bridge service module 362 may be implemented in a hybrid cloud computing environment 400. As used herein, a hybrid cloud computing environment 400 broadly refers to a cloud computing environment 400 whose associated data center assets may variously be physically located, operated, and managed, or a combination thereof, on the premises of both the user 202 of the cloud computing services it may provide and the premises of a third party provider of cloud computing services. As an example, an organization may have a dozen data center locations, each of which includes a data center monitoring and management environment.

In this example, the dozen data center monitoring and management environments were interconnected at some time in the past by a WAN, such as the Internet or a private corporate network, to operate as a single, proprietary cloud computing environment 400. At a later time, the organization decided to contract with a third part cloud computing services provider, whose third party cloud computing environment 400 is now used to provide certain cloud computing services to the organization on an as-needed basis for certain workloads. As a result, the combination of the organization's original proprietary cloud computing environment 400, and the third party cloud computing environment 400 used by the third party cloud computing services, results in the formation of a hybrid cloud computing environment 400 for the organization.

To continue the example, the third party cloud computing services provider may offer to provide the use of a cloud-based data center monitoring and management console 418 as a cloud computing service to the organization for cloud-based monitoring and management of their data center assets 244. In certain embodiments, the cloud-based data center monitoring and management console 418 may be operated by the organization's data center personnel, or the third party cloud computing service provider's personnel, or a combination thereof. In these embodiments, which personnel are selected to operate the cloud-based data center monitoring and management console 418, and which data center assets 244 are selected for it to monitor and manage, is a matter of design choice.

To further continue the example, the organization's data center assets 244, and their associated bridge service modules 362 physically reside within the organization's proprietary cloud computing environment 400. Likewise, the third party cloud computing services provider's cloud-based monitoring and management console 418 physically reside within their third party cloud computing environment 400. Accordingly the proprietary cloud computing environment 400 and the third party cloud computing environment 400, respectively operated and managed by the organization and the third party provider of cloud computing services, or a combination thereof, results in the formation of a hybrid cloud computing environment 400 when used in combination.

In certain embodiments, a data center asset 244 may be implemented to generate a connection code. As used herein, a connection code broadly refers to a unique series of alpha numeric characters, whose provision to the bridge service module 362 allow a cloud-based data center monitoring and management console 418 to connect to a data center asset 244 corresponding to the connection code. In various embodiments, the connection code may be implemented to have certain associated parameters. In certain embodiments, the parameters of the connection code may be implemented to include a connection type parameter, a permission of types of data access parameter, and a duration of access parameter, or a combination thereof. In various embodiments, a connection code may be generated as a result of a user 202 interacting with a particular data center asset 244 through its user interface (UI) 360, or an associated proprietary asset management system 406, or a combination of the two.

In certain embodiments, the interaction with the data center asset's 244 UI 360 may be performed locally and physically. For example, the user 202 may interact with a data center asset 244 through its control panel. In certain embodiments, the interaction with the data center asset's 244 UI 360 may be performed locally or remotely through the use of a user device 204. For example, the user 202 may use an associated user device 204 to interact with the data center asset 244 through an input/output (I/O) port, or through a network 140 connection (not shown), or a proprietary asset management system 406. In certain embodiments, the proprietary asset management system 406 may be implemented to manage a particular class of data center assets manufactured by a particular manufacturer. One such example of a proprietary asset management system 406 is OpenManage Enterprise (OME™) from Dell Technologies™, headquartered in Round Rock, Tex.

In various embodiments, the user 202 may be prompted to enter certain data center asset 244 information, access details, and permission information into the data center asset's UI 362. In certain of these embodiments, the data center asset 244 information, access details, and permission information may be used in the generation of an associated connection code. In various embodiments, the user 202 may manually enter a connection code of their choosing. In certain of these embodiments, the manually-entered connection code may be cross referenced to the data center asset 244 information, access details, and permission information In certain embodiments, the resulting alphanumeric connection code may be stored in either the data center asset 244 or its associated bridge service module 362. In certain embodiments, the alphanumeric connection code corresponding to an associated data center asset 244 may be stored in a binary code format in the data center asset 244 or its associated bridge service module 362. In certain embodiments, the alphanumeric connection code corresponding to an associated data center asset 244 may be stored in an encrypted form in the data center asset 244 or its associated bridge service module 362. In these embodiments, the method used to determine whether to store the alphanumeric connection in the data center asset 244, or its associated bridge service module 362, and the method used to determine the format or form in which it will be stored, is a matter of design choice.

In various embodiments, a user 202 may use a network 140 to access a cloud-based data center monitoring and management console 418. In certain embodiments, the user 202 may enter a request into the UI of the cloud-based data center monitoring and management console 418, as described in greater detail herein, to connect to a particular data center asset 244. In certain embodiments, the user 202 may then be prompted to enter a connection code corresponding to data center asset 244 into the UI of the cloud-based data center monitoring and management console 418.

In certain embodiments, the cloud-based data center monitoring and management console 418 may be implemented to provide the connection code entered by the user 202 to the bridge service module 362 associated with the data center asset. In certain embodiments, the bridge service module 362 may be implemented to receive a connection code corresponding to its associated data center asset 244. In certain embodiments, the bridge service module 362 may be implemented to securely receive a corresponding connection code from its associated data center asset 244 via the secure API 402. In certain embodiments, the bridge service module 362 may be implemented to compare the connection code entered by the user 202 to the connection code corresponding to its associated data center asset 244.

In certain embodiments, the bridge service module 362 may be implemented to establish a secure network connection 404 between the cloud-based data center monitoring and management console 418 and the data center asset 244 if the connection code entered by the user 202 matches the connection code corresponding to its associated data center asset 244. In certain embodiments, the secure network connection 404 may be implemented to securely exchange certain data center monitoring and management information between the data center asset 244 and the cloud-based data center monitoring and management console 418. In these embodiments, the method by which the secure network connection 404 is secured is a matter of design choice.

FIG. 5 is a simplified process flow diagram showing the performance of data center asset bridging operations implemented in accordance with an embodiment of the invention to generate a connection code corresponding to an associated data center asset. In various embodiments, as described in greater detail herein, a connection code may be generated as a result of a user interacting with a particular data center asset through its user interface (UI). In this embodiment, the user first accesses a data center asset through its UI in step 502, followed by entering a request in step 504, as likewise described in greater detail herein, for a connection code to be generated for the data center asset. A connection code is then generated in step 506, as described in greater detail herein, and once generated, provided to the data center asset's associated bridge service module in step 508.

FIG. 6 is a simplified process flow diagram showing the performance of data center asset bridging operations implemented in accordance with an embodiment of the invention to use a connection code to connect to an associated data center asset. In this embodiment, a user uses a network connection to access a cloud-based data center monitoring and management console in step 602, as described in greater detail herein. Then, in step 604, the user enters a request into the user interface (UI) of the cloud-based data center monitoring and management console, as likewise described in greater detail herein, to connect to a particular data center asset.

In response, the user is prompted step 606 to enter a connection code corresponding to data center asset into the cloud-based data center monitoring and management console's UI. In turn, the cloud-based data center monitoring and management console provides the connection code entered by the user to the bridge service module associated with the data center asset in step 608. The bridge service module then compares the connection code entered by the user to the connection code corresponding to its associated data center asset in step 610 to verify they match. If they do, then the bridge service module establishes a network connection between the cloud-based data center monitoring and management console and the data center asset in step 612 so they can exchange information.

FIG. 7 shows an example screen presentation of a data center asset user interface (UI) implemented in accordance with an embodiment of the invention to generate a connection code. In this embodiment, a data center asset UI 702 is implemented to display a "Generate Connection Code" 714 window. As shown in FIG. 7, the "Generate Connection Code" 714 window may be implemented to display an "Asset Information" 716 sub-window, an "Access Details" 718 sub-window, a "Permissions" 720 sub-window, and a "Connection Code" 722 sub-window.

As likewise shown in FIG. 7, the "Asset Information" 716 sub-window may be implemented to receive certain user input related to the data center asset, such as its name, its network address, its service tag number, and so forth. In certain embodiments, the user input entered into the "Asset Information" 716 sub-window may be implemented in the form of one or more connection type parameters. Likewise as shown in FIG. 7, the "Access Details" 718 sub-window may be implemented to receive certain user input related to data center asset access parameters, such as whether or not to always allow access, and if not, how long access should be granted, whether such access is for one time, or single session, the granted access date range, and so forth. In certain embodiments, the user input entered into the "Access Details" 718 sub-window may be implemented in the form of one or more duration of access parameters. The "Permissions" 720 sub-window, as shown in FIG. 7, may be implemented to receive certain permissions-related user input, such as whether or not a user is allowed to monitor, manage, or reboot the data center asset. In certain embodiments, the user input entered into the "Permissions" 720 sub-window may be implemented in the form of one or more permission of types of data access type parameters.

The "Connection Code" 722 sub-window may be implemented, as likewise shown in FIG. 7, to receive user input for generation of a unique connection code 724. As shown in FIG. 7, the "Connection Code" 722 sub-window may be implemented with a "Generate" command button 726, which can be invoked through the use of a user gesture, such as a mouse click. In this embodiment, invoking the "Generate" command button 726 results in the generation of a connection code 724 for the data center asset. As shown in FIG. 7, selecting the "Apply" 730 command button within the data center monitoring and management console UI 702 results in the selections made in the "Asset Information" 716, "Access Details" 718, "Permissions" 720, and "Connection Code" 722 sub-windows being applied.

Figure 8:
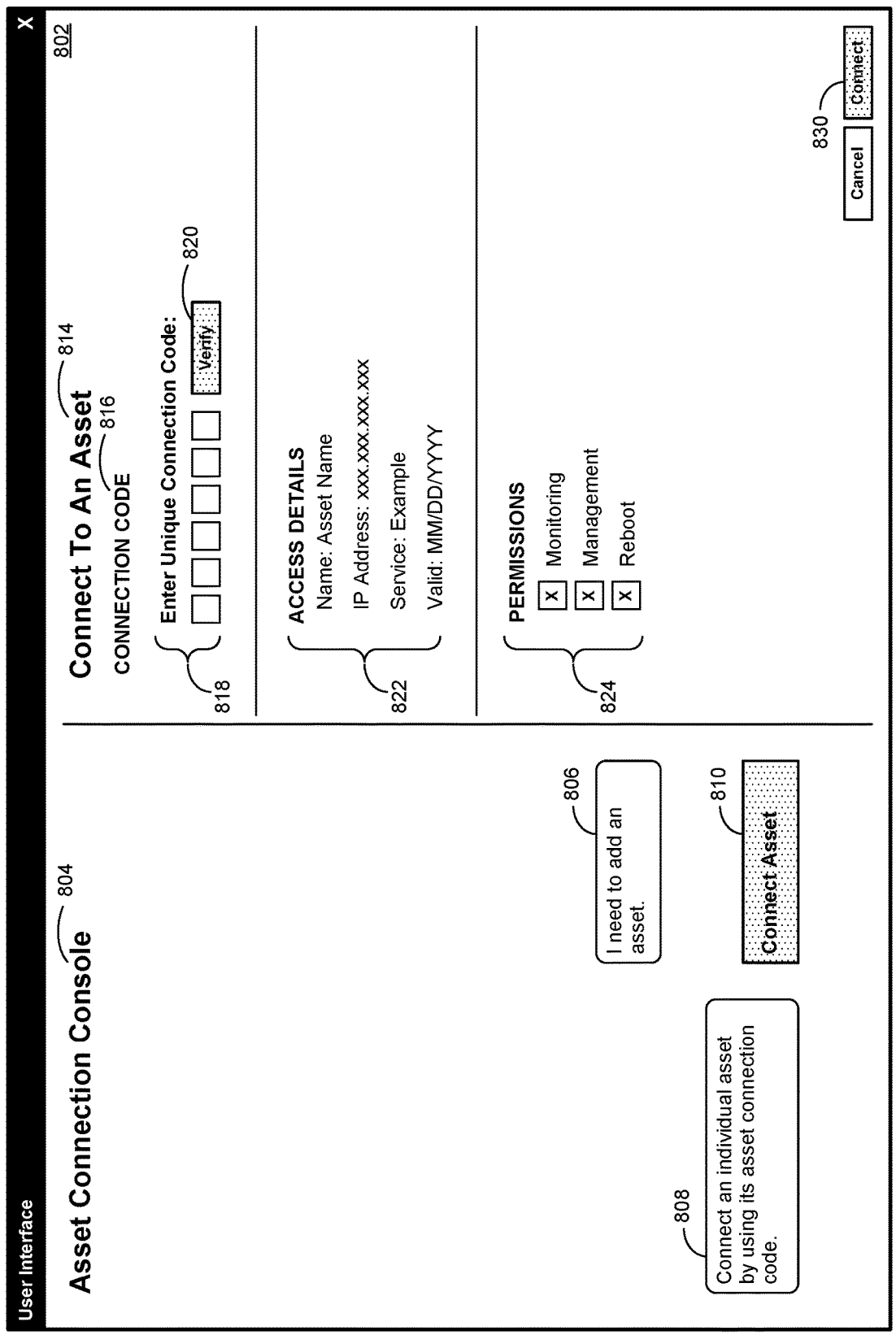
FIG. 8 shows an example screen presentation of a UI implemented to receive data center asset connection code input.

FIG. 8 shows an example screen presentation of a cloud-based data center monitoring and management console user interface (UI) implemented in accordance with an embodiment of the invention to receive a data center asset connection code. In this embodiment, the cloud-based data center monitoring and management console UI 802 is implemented to display an "Asset Connection Console" 804 window and a "Connect An Asset" 814 window, As shown in FIG. 8, a user may enter a request, such as "I need to add an asset." into a user request field 806. In response, the "Asset Connection Console" 804 window may be implemented to respond with a response, such as "Connect an individual asset by using its asset connection code" within a console response field 808.

In certain embodiments, the "Asset Connection Console" 804 window may be implemented to respond with a command button, such as "Connect Asset" 810. In this embodiment, selection of the "Connect Asset" 810 command button through the use of a user gesture, such as a mouse click, results in the "Connect To An Asset" 814 window being displayed within the UI 802 of the cloud-based data center monitoring and management console. As likewise shown in FIG. 8, the "Connect To An Asset" 814 window may be implemented to include a "Connection Code" 816 sub-window, an "Access Details" 822 sub-window, and a "Permissions" 824 sub-window. In this embodiment, the "Connection Code" 816 sub-window is implemented to present a connection code entry field 818 and a "Verify" 820 command button.

In this embodiment, once the "Connection Code" 816 sub-window is populated with a connection code and the "Verify" 820 command button is selected, then the "Access Details" 822 sub-window, and a "Permissions" 824 sub-window are populated with data center asset connection details. For example, as shown in FIG. 8, the "Access Details" 822 sub-window displays the data center asset's name, its IP address, its service name, and the date through which this information is valid. Likewise, the "Permissions" 824 sub-window displays certain permissions-related user input, such as whether or not a user is allowed to monitor, manage, or reboot the data center asset. As shown in FIG. 8, selecting the "Connect" 830 command button within the data center monitoring and management console UI 702 results in the cloud-based data center monitoring and management console being connected to the data center asst.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
   providing a data center asset with an associated data center asset bridging module, the data center asset comprising a data center asset user interface, the data center asset communicating with the associated data center asset bridging module via a secure application program interface, the secure application program interface being implemented to securely provide different levels of information associated with the data center asset to the associated data center asset bridging module during a data center asset bridging operation, the data center asset bridging operation establishing a network connection between the data center asset and a cloud-based data center monitoring and management console;

establishing access to the data center asset;

when access to the data center is established, enabling a connection between the cloud-based data center monitoring and management console and the data center asset via the data center asset bridging module;

exchanging information between the data center asset and the cloud-based data center monitoring and management console via the bridging module; and managing the data center asset via the data center asset user interface, the managing comprising entering a connection code and defining parameters for the connection code, the connection code comprising a unique series of alpha numeric characters, provision of the unique series of alpha numeric characters to the data center asset bridging module allowing the connection between the data center asset bridging module and the cloud-based data center monitoring and management console; and wherein the parameters for the connection code comprise a connection type parameter, a permission of types of data access parameter and a duration of access parameter.

2. The method of claim 1, further comprising:

prompting a request for the connection code for the data center asset to enable the cloud-based data center monitoring and management console to access the data center asset.

3. The method of claim 2, wherein:

the associated data center asset bridging module verifies accuracy of the connection code provided via the cloud-based data center monitoring and management console prior to allowing exchange of information between the data center asset and the cloud-based data center monitoring and management console.

4. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing a data center asset with an associated data center asset bridging module, the data center asset comprising a data center asset user interface, the data center asset communicating with the associated data center asset bridging module via a secure application program interface, the secure application program interface being implemented to securely provide different levels of information associated with the data center asset to the associated data center asset bridging module during a data center asset bridging operation, the data center asset bridging operation establishing a network connection between the data center asset and a cloud-based data center monitoring and management console;

establishing access to the data center asset;

when access to the data center is established, enabling a connection between the cloud-based data center monitoring and management console and the data center asset via the data center asset bridging module;

exchanging information between the data center asset and the cloud-based data center monitoring and management console via the bridging module; and, managing the data center asset via the data center asset user interface, the managing comprising entering a connection code and defining parameters for the connection code, the connection code comprising a unique series of alpha numeric characters, provision of the unique series of alpha numeric characters to the data center asset bridging module allowing the connection between the data center asset bridging module and the cloud-based data center monitoring and management console; and wherein the parameters for the connection code comprise a connection type parameter, a permission of types of data access parameter and a duration of access parameter.

5. The system of claim 4, wherein the instructions executable by the processor are further configured for:

prompting a request for the connection code for the data center asset to enable the cloud-based data center monitoring and management console to access the data center asset.

6. The system of claim 5, wherein:

the associated data center asset bridging module verifies accuracy of the connection code provided via the cloud-based data center monitoring and management console prior to allowing exchange of information between the data center asset and the cloud-based data center monitoring and management console.

7. A non-transitory, computer-readable storage medium embodying computer program code, the computer program code comprising computer executable instructions configured for:

providing a data center asset with an associated data center asset bridging module, the data center asset comprising a data center asset user interface, the data center asset communicating with the associated data center asset bridging module via a secure application program interface, the secure application program interface being implemented to securely provide different levels of information associated with the data center asset to the associated data center asset bridging module during a data center asset bridging operation, the data center asset bridging operation establishing a network connection between the data center asset and a cloud-based data center monitoring and management console;

establishing access to the data center asset;

when access to the data center is established, enabling a connection between cloud-based data center monitoring and management console and the data center asset via the data center asset bridging module;

exchanging information between the data center asset and the cloud-based data center monitoring and management console via the bridging module; and managing the data center asset via the data center asset user interface, the managing comprising entering a connection code and defining parameters for the connection code, the connection code comprising a unique series of alpha numeric characters, provision of the unique series of alpha numeric characters to the data center asset bridging module allowing the connection between the data center asset bridging module and the cloud-based data center monitoring and management console; and wherein the parameters for the connection code comprise a connection type parameter, a permission of types of data access parameter and a duration of access parameter.

8. The non-transitory, computer-readable storage medium of claim 7, wherein the instructions executable by the processor are further configured for:

prompting a request for the connection code for the data center asset to enable the cloud-based data center monitoring and management console to access the data center asset.

9. The non-transitory, computer-readable storage medium of claim 8, wherein:

the associated data center asset bridging module verifies accuracy of the connection code provided via the cloud-based data center monitoring and management console prior to allowing exchange of information between the data center asset and the cloud-based data center monitoring and management console.

* * * * *